United States Patent [19]

Härtel

[11] 4,005,340
[45] Jan. 25, 1977

[54] APPARATUS FOR THE CURRENT LIMITING INTERRUPTION OF CURRENTS AT HIGH VOLTAGES

[75] Inventor: Hagen Härtel, Braunschweig, Germany

[73] Assignee: Dieter Kind, Braunschweig, Germany

[22] Filed: May 9, 1975

[21] Appl. No.: 576,235

[52] U.S. Cl. .............................. 317/11 A; 307/135; 307/136; 317/11 C; 317/11 E
[51] Int. Cl.² ........................................... H02H 7/22
[58] Field of Search ............ 317/11 A, 11 C, 11 E, 317/11 R, 11 B; 307/136, 135, 134

[56] References Cited
UNITED STATES PATENTS

| | | | |
|---|---|---|---|
| 3,249,810 | 5/1966 | Strom et al. | 317/11 A |
| 3,454,831 | 7/1969 | Willard | 307/136 X |
| 3,737,724 | 6/1973 | Salge et al. | 317/11 A |
| 3,758,790 | 9/1973 | Kind et al. | 317/11 R X |
| 3,809,959 | 5/1974 | Pucher | 317/11 C X |

Primary Examiner—J. D. Miller
Assistant Examiner—Patrick R. Salce
Attorney, Agent, or Firm—Spencer & Kaye

[57] ABSTRACT

A circuit arrangement for the current-limiting interruption of high-voltage direct and alternating currents including a commutation switch connected in the high-voltage main, a residual current switch connected to the commutation switch and a shunt path connected in parallel with the commutation switch and including a temperature dependent resistor with a strongly positive temperature coefficient and a spark path connected in series with the resistor. The firing voltage of the spark path is such that the spark path responds after a predetermined arc voltage has been reached at the commutation switch to cause the current to commutate to the shunt path.

3 Claims, 6 Drawing Figures

APPARATUS FOR THE CURRENT LIMITING INTERRUPTION OF CURRENTS AT HIGH VOLTAGES

BACKGROUND OF THE INVENTION

The present invention relates to a circuit arrangement for the current limiting interruption of high voltage direct and alternating currents. More particularly the present invention relates to such a circuit arrangement including at least one commutating switch which is connected to a residual current switch, and at least one shunt path connected in parallel with the commutation switch with the shunt path including a temperature dependent resistor with a highly positive temperature coefficient.

Circuit arrangements for the current limiting interruption of direct and alternating currents at high voltage are known in which one or a plurality of commutation switches are connected in parallel with capacitances and resistances for the intermediate commutation and generation of a zero current passage in the commutation switch. In these known circuit arrangements the capacitances are usually provided with series-connected spark paths so that they become effective only after a certain firing voltage has been reached by the commutation switch. After the intermediate commutation the current to be switched off is then handled by a highly resistive energy absorber. Thus the current is reduced to a residual value which can be switched off by a series-connected residual current switch. Such a circuit arrangement is disclosed in the publication ETZ-A volume 91 (1970), pages 79–82.

In these arrangements, the expenditures for the shunt path are considerable if commercially available elements such as capacitors and silicon carbide resistors, for example, are used. A further drawback of silicon carbide absorbers is that this material has a thermal cooling time constant of several 10 minutes and thus can be subjected to renewed loads only after switch-off for a relatively long period of time. Alternatively, the volume of the absorber must be substantially increased.

Circuits are also known in which one or a plurality of series-connected power switches are connected in parallel with temperature dependent resistors having a high positive temperature coefficient. These parallel resistors bridge the interruption arc and are provided to facilitate quenching by attenuating the recurring voltage. The parallel resistors are low-ohmic when cold and thus facilitate commutation. Upon completion of the commutation, the resistors are heated by the switch-off current and thus increase their resistance value by a multiple. The residual current is again switched off by a series-connected residual current switch. Such a circuit arrangement is shown in German Pat. No. 969,067. It has been found, however, that a direct parallel connection of a commutation switch and a temperature dependent resistor is not favorable for commutation.

SUMMARY OF THE INVENTION

According to the present invention, a commutation which is much easier than was attainable according to the prior art, is realized by providing a circuit arrangement including at least one commutation switch connected in a high-voltage power main, a residual current switch connected to the commutation switch and at least one shunt path which has a temperature dependent resistor with a highly positive temperature coefficient and which is connected in parallel with the commutation switch, with a spark path which is connected in series with the temperature dependent resistor and which has a firing voltage such that the spark path will respond when a certain arc voltage has been reached in the commutation switch to cause the current to commutate to the shunt path. This arrangement according to the invention produces solutions which are more economical and more efficient than the known circuits. Suitable materials for the temperature dependent resistors are pure metals, particularly nickel, iron and tungsten, which are usually employed in the form of wires.

According to a first specific embodiment of the invention, the commutation switch is connected in series with the residual current switch and the shunt path, with the resistor and the spark path, is connected in parallel with the commutation switch.

According to a further embodiment of the invention, two commutation switches and the residual current switch are connected in series in the current main, a first shunt path including the series connection of a first spark path and a first temperature dependent resistor with a highly positive temperature coefficient is connected in parallel with one of the commutation switches, and a second shunt path, including the series connection of a second spark path and a second temperature dependent resistor with a highly positive temperature coefficient, is connected in parallel with the series connection of the two commutation switches.

According to still a further embodiment of the invention first and second series connected commutation switches are connected in series in the current main, a first shunt path including a series connected spark path and a temperature dependent resistor is connected in parallel with the first commutation switch, a second shunt path including the series connection of a quenching spark path and another temperature dependent resistor is connected in parallel with the series connection of the first and second commutation switches, and an auxiliary shunt path, including the series connection of a spark path and a capacitor, is connected in parallel with the quenching spark path.

DETAILED DESCRIPTION OF THE PREFERRED EMBODIMENTS

Figure 1:
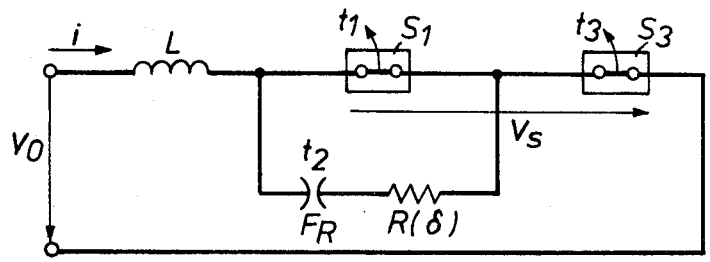
FIG. 1 shows a circuit arrangement according to one embodiment of the present invention with a temperature dependent resistor acting as the inverse voltage generator and simultaneously as the energy absorber.

Referring now to FIG. 1 there is shown a current main or net in which a current i at a high voltage is flowing and which is to be switched off with the circuit arrangement according to the invention.

In FIG. 1, $V_0$ is the driving voltage during the switch-off process and L the net or main inductance which is assumed to be concentrated. Connected in the main in a known manner is a commutation switch $S_1$ which, when opened, is capable of generating an arc voltage of several kV at a current of several kA. Also connected in the main in series with the commutation switch $S_1$ is the residual current switch $S_3$ which can generate a high switching voltage at low currents in order to interrupt the residual current. Connected in parallel with the commutation switch $S_1$ is a shunt commutation path including the series connection of a spark path $F_R$ and a temperature dependent resistor $R(\delta)$ with a highly positive temperature coefficient. In a known manner, the spark path $F_R$ is constructed so that its threshold or firing voltage is sufficiently high so that it responds only after a predetermined arc voltage has been produced at the commutation switch $S_1$ upon opening thereof. The resistor $R(\delta)$ is in turn dimensioned so that in its cold state it can take over or accommodate the maximum current passing through the commutation switch $S_1$ at the threshold voltage of the spark path $F_R$ and can be heated to such an extent that at its maximum energy absorption it reaches its highest permissible resistance value without being destroyed.

Figure 2:
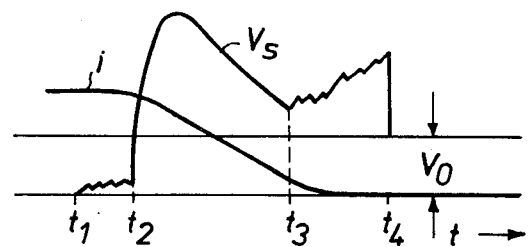
FIG. 2 shows the current and voltage curves for the circuit arrangement of FIG. 1.

The circuit arrangement of FIG. 1 operates as follows (see FIG. 2): at time $t_1$ the contact pieces of the commutation switch $S_1$ open and an increasing arc voltage is generated. At $t_2$ the response or firing voltage value of spark path $F_R$ is reached, which lies at several kV. Consequently at $T_2$ the spark path $F_R$ fires and effectively connects the temperature dependent resistor $R(\delta)$ in parallel with commutation switch $S_1$. Resistor $R(\delta)$ is designed to have such low resistivity in its cold state that it completely absorbs the current to be switched off from commutation switch $S_1$. The arc in commutation switch $S_1$ is thus extinguished. The current i now flows completely through $R(\delta)$ which absorbs energy $W(\tau)$:

$$W(\tau) = \int_0^\tau i^2(t) \cdot R(\delta) \, dt$$

Corresponding to the energy absorption, resistor $R(\delta)$ will heat up and thus increase its resistance value. With a constant current, a voltage would be built up (a short time after $t_2$) which is proportional to the increase in resistance and which, depending on the material employed for resistor $R(\delta)$, can rise to a multiple of the arc voltage of commutation switch $S_1$. Due to the fact that the voltage across $R(\delta)$ is greater than the driving voltage $V_0$ and resistor $R(\delta)$ absorbs energy, the current i is reduced. At time $T_3$ the contacts of residual current switch $S_3$ open and an arc voltage is produced. By cooperation of resistor $R(\delta)$ and switch $S_3$, the current i is reduced further and finally switched off at $t_4$.

In the operation of the circuit arrangement of FIG. 1 just described the majority of the switching energy was absorbed by resistor $R(\delta)$. The circuit according to FIG. 1 has the advantage compared to the known circuits where a capacitor is connected in parallel with commutation switch $S_1$ and a parallelly connected energy absorber of silicon carbide is provided, that only one element, the temperature dependent resistor $R(\delta)$, is required for two tasks, i.e., generating the inverse voltage and absorbing energy. It should also be considerably less expensive than a commutation capacitor and less expensive than the otherwise additionally required silicon carbide absorber. Moreover resistor $R(\delta)$ has the following advantages in operation:

After commutation of the current i to be switched off from the commutation switch $S_1$ into resistor $R(\delta)$, the voltage is built up during a period of time of a few 100μs to a ms. Compared to the voltage build-up at a commutation capacitor (in several 10μs) this is very slow so that less danger exists that excess voltages are produced in the net or main by reflected travelling waves. The thermal cooling time constants of temperature dependent resistors, particularly if liquids are used as the surrounding cooling medium, lie in the order of magnitude of several seconds. However, for silicon carbide they lie in the order of several 10 minutes. An energy absorber of a temperature dependent resistance material is thus much faster able to accept a load again than an absorber of silicon carbide, or alternatively, if a silicon carbide absorber is to be ready for operation after a time period of a few seconds, it must be given a capacity which is a multiple of that actually required. The drawback that with decreasing current the voltage drop across the absorber and thus the switch voltage, is reduced is about the same with both types of absorbers.

Figure 3:
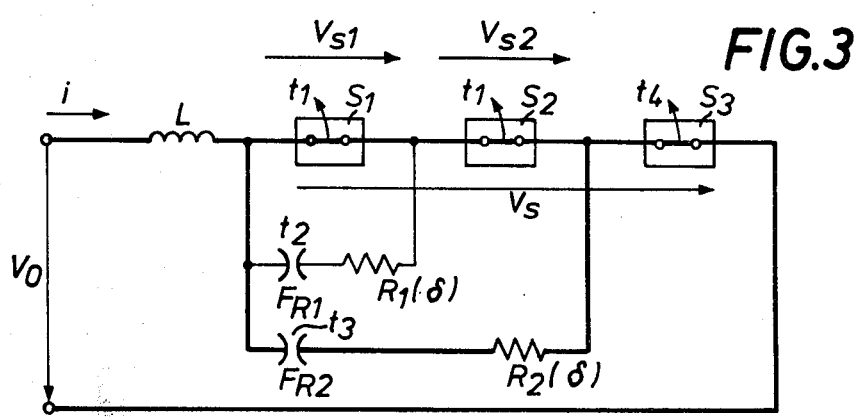
FIG. 3 shows a circuit arrangement according to another embodiment of the invention having two temperature dependent resistors of which one is intended as the inverse voltage generator and the other predominantly as the energy absorber.
Figure 4:
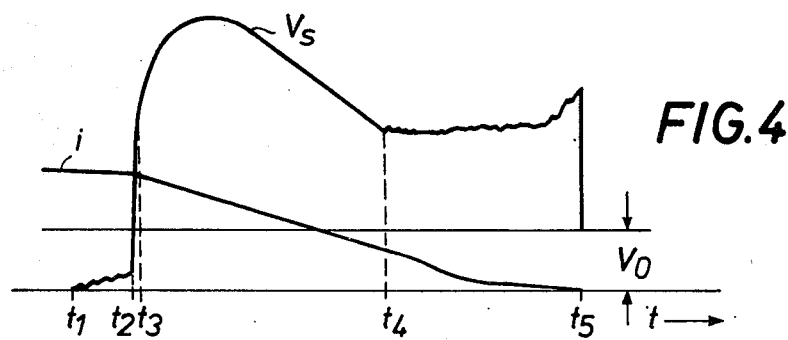
FIG. 4 shows the current and voltage curves for the circuit arrangement of FIG. 3.

FIG. 3 and the associated diagram (FIG. 4) shows a circuit variation in which the functions of voltage build-up and energy absorption are distributed to different specially optimized resistors. According to the circuit arrangement of FIG. 3, the arrangement of FIG. 1 is modified in that an additional commutation switch $S_2$ is connected in series between the commutation switch $S_1$ and the residual current switch $S_3$ and a further shunt path is connected in parallel with the series connection of the two commutation switches $S_1$ and $S_2$. This further shunt path includes a further spark path $F_{R2}$ and a further temperature dependent resistor $R_2(\delta)$ with a highly positive temperature coefficient. In this arrangement the resistor $R_1(\delta)$ in parallel with the commutation switch $S_1$ is designed to absorb only a small amount of the energy. The resistor $R_2(\delta)$ is designed so that even in its cold state it has a much higher resistance value than the resistor $R(\delta)$ of FIG. 1. Moreover the threshold or firing value of the spark path $F_{R2}$ is substantially higher than that of either $F_R$ (FIG. 1), $F_{R1}$ (FIG. 2) and the driving voltage $V_0$ on the main.

The circuit arrangement of FIG. 3 operates as follows: At time $t_1$ the contact pieces of commutation switches $S_1$ and $S_2$ open and arc voltages are produced at both switches. When the threshold value (several kV of spark $F_{R1}$ is exceeded at time $t_2$ the temperature dependent resistor $R_1$ ($\delta$) is switched in, i.e., conductively connected in parallel with switch $S_1$. Resistor $R_1$ ($\delta$) which as indicated above, is designed to absorb only a little energy, then takes over the current i to be switched off and the arc in commutation switch $S_1$ is quenched. Thereafter resistor $R_1$ ($\delta$) heats up very quickly (fraction of a ms) and thus increases its resistance value, e.g., to about 15 times its original value. Since the current i to be switched off during this time period ($t_2$ to $t_3$) remains approximately constant, the voltage drop across $R_1$ ($\delta$) is also increased 15-fold.

Thus, $R_1(\delta)$ builds up an inverse voltage at the switch. At time $t_3$ the sum voltage $V_{S1} + V_{S2}$ which is combined of the voltage drop across $R_1(\delta)$ and the arc voltage of commutation switch $S_2$ exceeds the threshold value of spark path $F_{R2}$. This results in the energy absorber resistor $R_2(\delta)$ being connected conductively in parallel with the series connection of resistor $R_1(\delta)$ and commutation switch $S_2$ and taking over the current $i$ to be switched off. This in turn results in the arc in commutation switch $S_2$ being quenched and resistor $R_1(\delta)$ becoming free of current. The current $i$ now flowing in resistor $R_2(\delta)$, which, as indicated above, has a much higher value even in its cold state than $R(\delta)$ of FIG. 1, results in the resistor $R_2(\delta)$ absorbing energy which heats the resistor $R_2(\delta)$ and further increases its resistance value. Depending on how fast the current $i$ drops after time $t_3$ the voltage drop across resistor $R_2(\delta)$ will increase or decrease. At $t_4$ the contact pieces of residual current switch $S_3$ open and its arc voltage continues to reduce the current in cooperation with the voltage drop across resistor $R_2(\delta)$. At time $t_5$ the current $i$ is finally switched off.

Depending on the resistor material employed the increase in resistance at $R_1(\delta)$ may go up to 20 times the original value. This produces a voltage which is approximately 20 times as high as the value of the arc voltage of commutation switch $S_1$ which is required for commutation, i.e., the firing or threshold value of $F_{R1}$. For this reason it is possible to commutate into a relatively high-ohmic resistor $R_2$ which need not necessarily be temperature dependent.

Compared to the arrangement of FIG. 1, the circuit arrangement of FIG. 3 has the advantage that during the switching off process lower currents than the rated current are still sufficient to build up high inverse voltages at the switch. Since resistor $R_1(\delta)$ is designed to absorb only little energy, it will be heated strongly even at low currents so that the full rise in resistance occurs. Due to the lower current, the voltage drop across resistor $R_1(\delta)$ is less than for the rated current, however. But since the commutation switch $S_2$ produces a higher arc voltage at lower currents — this is known to be a property of intensively cooled switching arcs — it is nevertheless possible to realize a sufficiently high voltage to cause spark path $F_{R2}$ to respond.

Figure 5:
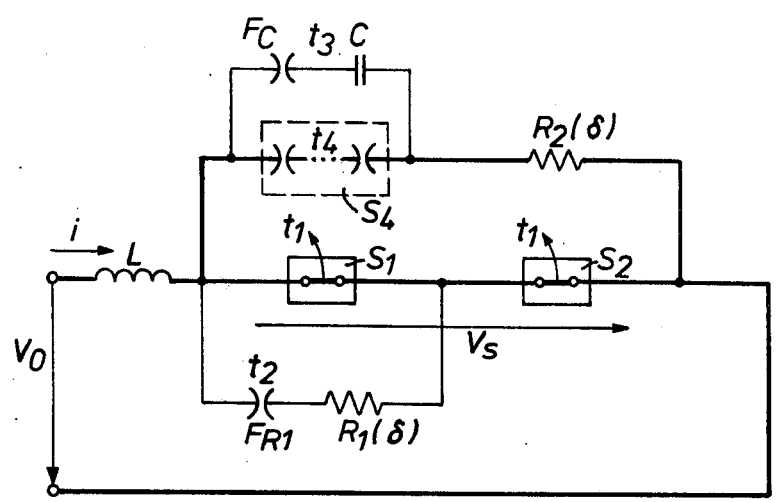
FIG. 5 shows a circuit arrangement according to still another embodiment of the invention which, as does FIG. 3, has two temperature-dependent resistors where the residual current cut-off is effected in a known manner, however, by a series-connection of a quenching spark path.

FIG. 5 shows a further circuit variation in which the parallel connection of a quenching spark path (multiple spark path) $S_4$ with a spark path $F_c$ and a series-connected capacitor C is used instead of the spark path $F_{R2}$ (FIG. 3). With this arrangement the residual current is switched off in a known manner by the quenching spark path $S_4$ so that a separate residual current switch is not required. A quenching spark path operating as a residual current switch is disclosed in Swedish patent Application No. 3619/72.

This has the further advantage that the quenching spark path $S_4$ in the shunt path need not be designed for continuous current as is the residual current switch $S_3$ of FIGS. 1 and 3. Circuit elements $F_c$ and C serve to assure dependable operation of the switching arrangement even when the currents to be switched off are low.

Figure 6:
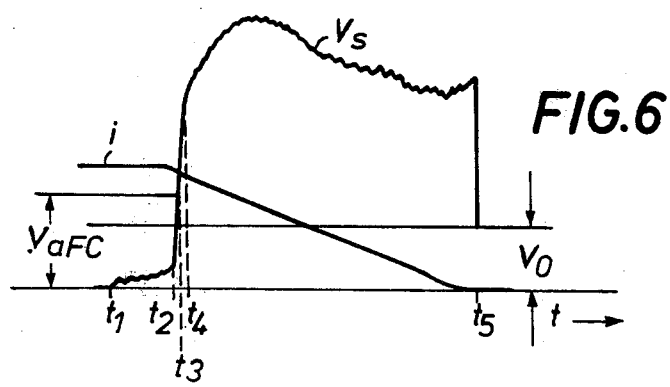
FIG. 6 shows the current and voltage curves for the circuit arrangement of FIG. 5.

FIG. 6 shows the current and voltage curves associated with the operation of the circuit arrangement of FIG. 5 which operates as follows: At time $t_1$ the two commutation switches $S_1$ and $S_2$ open and each produces an arc voltage of several $kV$. At time $t_2$ the threshold value of spark path $F_{R1}$ is reached and $R_1(\delta)$ is connected conductively in parallel with switch $S_1$. This causes the current $i$ to commutate to resistor $R_1(\delta)$ and the arc in switch $S_1$ to be extinguished. Again, resistor $R_1(\delta)$ is designed for low energy absorption so that it will heat up quickly and increase its resistance value. At time $t_3$ the threshold value $V_{aFC}$ of spark path $F_c$ is exceeded causing spark path $F_c$ to fire and capacitor C (several 10 nF) to be connected in series with resistor $R_2(\delta)$. The current $i$ to be switched off now commutates from the series-connection of $R_1(\delta)$ and commutation switch $S_2$ into the series-connection of capacitor C and resistor $R_2(\delta)$. This is possible at low currents. The arc is switch $S_2$ is thus extinguished, and resistor $R_1$ has no current. The current flowing through spark path $F_c$ and capacitor C causes a voltage to be built up at capacitor C in fractions of a $\mu s$ which voltage causes the multiple spark path $S_4$ to respond at $t_4$. The current $i$ to be switched off now takes the current path $S_4 - R_2(\delta)$. The current $i$ is reduced and is switched off at $t_5$.

In case the current $i$ to be switched off is too high to commutate to the C-$R_2$ circuit (this will be the normal case since the $F_c$-C circuit is designed only for particularly low currents) the voltage occurring, after firing of spark path $F_c$, across capacitor C and resistor $R_2$ will immediately cause a return commutation to the $R_1(\delta)$ - $S_2$ circuit. Resistor $R_1(\delta)$ can be heated up further and produces an increasing voltage which finally, in conjunction with the arc voltage of switch $S_2$ suffices to produce a commutation to the $S_4$-$R_2$ circuit. Switch $S_2$ and resistor $R_1$ then have no current. The series connection of fired quenching spark path $S_4$ and energy absorber resistor $R_2(\delta)$ results in resistor $R_2(\delta)$ increasing its resistance value depending on the energy absorbed, and the current $i$ to be reduced. This finally causes the arc in quenching spark path $S_4$ to be extinguished and the current $i$ to be switched off completely at time $t_5$. Although the spark path $F_c$ will be fired again and again while the quenching spart path $S_4$ is burning, this, however, has no influence on the switching-off process. At the end of the switching-off process the capacitor C, which is connected in parallel with quenching spark path $S_4$ may even substantially support the final quenching of the arc in quenching spark path $S_4$.

The following are examples for the average values of specific circuit arrangements for each of the three illustrated embodiments of FIGS. 1, 3 and 5:

a) FIG. 1:
| | | | |
|---|---|---|---|
| driving voltage | $V_0 = 25$ kV | | |
| current | $i_{max} = 5$ kA | | |
| firing voltage | $V_{FR} = 5$ kV | | |
| sum voltage | $V_{Smax} = 15$ kV | | |
| resistance R ($\delta$) | | | |
| material | tungsten | | |
| value | $R_{20}$ $c = 1\ \Omega$, | $R_{120}$ | $c = 15\ \Omega$ |
| power absorbtion | some MWs | | |
| time - | | | |
| $t_1 - t_2$ | = 10 ms | | |
| $t_2 - t_3$ | = some 10 ms | | |
| $t_3 - t_4$ | = some ms | | | b) FIG. 3:
| | | | |
|---|---|---|---|
| driving voltage | $V_0 = 25$ kV | | |
| current | $i_{max} = 5$ kA | | |
| firing voltages | $V_{FR1} = 5$ kV, | $V_{FR2} = 50$ kV | |
| sum voltage | $V_{Smax} = 150$ kV | | |
| resistance $R_1(\delta)$ | | | |
| material | tungsten | | |
| value | $R_{20}$ $c = 1\ \Omega$, | $R_{120}$ | $c = 15\ \Omega$ |
| power absorbtion | some kWs | | |
| resistance $R_2(\delta)$ | | | |
| material | iron | | |
| value | $R_{20}$ $c = 10\ \Omega$, | $R_{200}$ | $c = 30\ \Omega$ |

-continued

| | | |
|---|---|---|
| power absorbtion | some MWs | |
| time - | | |
| $t_1 - t_2$ | = 10 ms | |
| $t_2 - t_3$ | = 1 ms | |
| $t_3 - t_4$ | = some 10 ms | |
| $t_4 - t_5$ | = some ms | |
| c) FIG. 5: | | |
| driving voltage | $V_0 = 25$ kV | |
| current | $i_{max} = 5$ kA | |
| firing voltages | $V_{FR1} = 5$ kV, | $V_{FC} = 10$ kV |
| | $V_{S4} = 75$ kV | |
| sum voltage | $V_{smax} = 150$ kV | |
| resistance $R_1(\delta)$ | | |
| material | tungsten | |
| value | $R_{20}$ $c = 1$ Ω, | $R_{120}$ $c = 15$ Ω |
| power absorbtion | some kWs | |
| resistance $R_2(\delta)$ | | |
| material | iron | |
| value | $R_{20}$ $c = 10$ Ω, | $R_{200}$ $c = 30$ Ω |
| power absorbtion | some MWs | |
| capacitor | C = 50 nF | |
| time - | | |
| $t_1 - t_2$ | = 10 ms | |
| $t_2 - t_3$ | = 0.5 ms | |
| $t_3 - t_4$ | = 0.5 ms | |
| $t_4 - t_5$ | = some 10 ms | |

It will be understood that the above description of the present invention is susceptible to various modifications, changes and adaptations, and the same are intended to be comprehended within the meaning and range of equivalents of the appended claims.

What is claimed is:

1. In a circuit arrangement for the current-limiting interruption of high-voltage direct and alternating currents including a commutation switch connected in a high-voltage main, a residual current switch connected to said commutating switch, and a shunt path connected in parallel with said commutation switch with said shunt path including the series connection of a spark path and a temperature dependent resistor having a strongly positive temperature coefficient, the firing voltage of said spark path being such that said spark path responds after a predetermined arc voltage has been reached at said commutation switch upon opening thereof to cause the current to commutate to said shunt path, and said temperature dependent resistor being dimensioned so that in its cold state it can fully take over the maximum current of said commutation switch at said threshold value for the series-connected spark path and is heated to such an extent that, at maximum energy absorption, it reaches its highest permissible rise in resistance without being destroyed; the improvement comprising: a further commutation switch connected in series with said first mentioned commutation switch; a further shunt path connected in parallel with the series connection of said first mentioned commutation switch and said further commutation switch, said further shunt path including the series connection of a quenching spark path, with constitutes said residual current switch, and a further temperature dependent resistor having a strongly positive temperature coefficient; an auxiliary shunt path connected in parallel with said quenching spark path and including the series connection of another spark path and a capacitor; and said quenching spark path has a firing voltage which is substantially higher than that of said first mentioned spark path and that of said another spark path.

2. A circuit arrangement as defined in claim 1 wherein said further temperature dependent resistor is dimensioned so that the voltage drop occurring thereacross will not exceed the permissible voltage of the main when the current to be switched off is at a maximum.

3. A circuit arrangement as defined in claim 1 wherein the firing voltage of said another spark path is higher than that of said first mentioned spark path.

* * * * *